United States Patent Office 2,920,055
Patented Jan. 5, 1960

2,920,055

POLYVINYL CHLORIDE RESIN COMPOSITIONS COMPRISING A POLYVINYL CHLORIDE RESIN, A POLYVINYL CHLORIDE RESIN PLASTICIZER, AND AN ALKYL PHENOL ESTER

William E. Leistner and Olga H. Knoepke, Brooklyn, N.Y., assignors to Argus Chemical Corporation, a corporation of New York No Drawing. Application April 5, 1954
Serial No. 421,166

6 Claims. (Cl. 260—31.2)

This invention relates to esters of mono and dialkyl-phenols with mono-carboxylic acids.

These new esters are useful as liquids in hydraulic systems, heat transfer agents, and lubricants, either alone or in admixture with other liquids. The esters are particularly useful as plasticizers for polyvinyl chloride resins and for that reason will be first illustrated by description in connection with the use as plasticizers.

In the art of polyvinyl chloride plastics, dioctyl phthalate (DOP) is widely used as plasticizer and is a suitable standard, therefore, with which proposed plasticizers may be compared. So compared, our new class of plasticizers includes compounds that are much lower in cost than DOP per unit of weight, satisfactory in compatibility with the resin under various temperature conditions, higher in modulus of rupture than comparable polyvinyl chloride compositions including DOP as the plasticizer, and adapted to replace a relatively large proportion of the polyvinyl chloride resin in the finished plastic. Some of our new compounds are also less volatile in the plastic composition than is DOP.

Briefly stated, our invention comprises esters of the kind described and of balanced carbon to oxygen ratio and molecular size. This balance of composition, in the compounds of the stated desirable properties as plasticizers, is 17–40 carbon atoms, 2–4 oxygen atoms to the molecule of the ester, and 8–12 carbon atoms in at least one alkyl group substituted in the phenol.

These alkyl phenol esters have the formula:

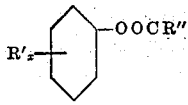

where $x$ is an integer having a value selected from the group consisting of one and two, R' is an alkyl radical having from one to twelve carbon atoms, and at least one R' has at least eight carbon atoms, and R" is an aliphatic hydrocarbon radical having a number of carbon atoms to give a total of from seventeen to forty carbon atoms in the alkyl phenol ester molecule.

The invention comprises also polyvinyl chloride plastics including one or more of the said esters in the plasticizer component of the plastic.

Examples of the esters of the present invention are octylphenyl octoate and laurate; nonylphenyl acetate, caproate and laurate; nonylcresyl propionate; dodecylphenyl octoate; and dinonylphenyl acetate.

In general, the new esters are prepared by reaction of the alkylphenol, whose radical is to be a part of the finished ester, with the acyl chloride or anhydride of the acid to be represented also in the finished ester. The reactants are reacted to advantage in contact with anhydrous sodium acetate or like conventional promoter of this kind of esterification reaction.

The phenols used may be any one of those represented in the compounds named above. At least 1 alkyl group on the selected phenol must contain 8–12 carbon atoms.

Phenols that meet these requirements and that may be used are the octyl, nonyl and dodecyl phenols and the corresponding alkyl derivatives of cresol. Additional examples are the corresponding dialkyl derivatives of phenol and also such derivatives in which one of the alkyls contains 1–12 carbon atoms, as in methyl, ethyl, or dodecyl groups, the groups being selected so that the total number of carbons in the molecule of the finished ester is 17–40.

Acids that may be used in the esters are acetic, propionic, butyric, caproic, caprylic, and lauric acid.

As the polyvinyl chloride resin used in the composition plasticized with our new esters, we use polyvinyl chloride or other halide and its copolymers with vinyl acetate, vinylidene chloride, styrene, dialkyl fumarate or maleate or other alkyl esters of mono olefinic acids. As the halogen represented, we ordinarily use the chloride and find no offsetting advantage in the use of the more expensive fluoride or bromide.

The invention will be further illustrated by description in connection with the following specific examples of the practice of it, proportions in these examples being expressed as parts by weight and pressures as mm. of mercury.

Example 1

Dinonylphenyl acetate $(C_9H_{19})_2C_6H_3OOC.CH_3$ was made as follows:

34.6 parts of dinonylphenol (0.1 mol) was mixed with 20.4 parts of acetic anhydride (0.2 mol) and 2 parts of anhydrous sodium acetate. The mixture was refluxed for 2 hours and then cooled and poured into 250 parts of cold water. Two layers formed. These were separated by difference of specific gravity and the upper (organic) layer was distilled at 9 mm. The foreshot was discarded. The main fraction distilling at 200°–220° C. was collected as the desired ester.

This ester was a pale yellow liquid weighing 36 parts corresponding to a yield of about 93%. The index of refraction $n_D^{25°}$ was 1.4880 and the saponification number was 140 (calculated 144).

Example 2

Nonylphenyl laurate $C_9H_{19}.C_6H_4OOC.C_{11}H_{23}$ was made by mixing 109 parts of lauryl chloride $(C_{11}H_{23}CO.Cl)$ and 110 parts of nonylphenol and heating the mixture in a boiling water bath for 2 hours. The reaction product was then heated in vacuo to 250° C., the foreshot distilling at 10 mm. up to 250° C. being discarded. The remaining high boiling residue was a light colored clear liquid of weight 192 parts and saponification number 138 as compared to the calculated value of 139.5 for nonylphenyl laurate.

Example 3

The procedure of Example 2 was followed except that octylphenol was substituted in equivalent proportions for the nonylphenol. The resulting octylphenyl laurate had the same general appearance and its properties were similar to those of the corresponding nonyl ester.

Example 4

Dodecylphenyl 2-ethylhexoate was prepared by mixing 131 parts of dodecylphenol and 82.5 parts of 2-ethylhexoyl chloride. The mixture became dark red and evolved hydrogen chloride without external heating. Then the mixture was heated in a warm water bath for 3 hours during which time the color changed to yellow. Unreacted materials were distilled as a foreshot up to 250° C. under 10 mm. pressure. The residue was 198 parts of a dark yellow liquid of saponification number 141 as compared to 144 calculated for dodecylphenyl octoate.

The procedure of this example was repeated with the substitution of octylphenol and also of nonylphenol, each on an equivalent weight basis for the dodecylphenol, with the production of liquid compounds of similar properties.

Example 5

This and the following examples relate to making polyvinyl chloride plastics, esters of the kind described being used as plasticizers.

100 parts of VYNS (copolymer of about 90% vinyl chloride and 10% vinyl acetate) was milled with a mixture of 15 parts of dinonylphenyl acetate and 30 parts of dioctylphthalate (DOP), the acetate being the product of Example 1 above. Included in the mix was a stabilizer consisting of 1 part of trioctyl phosphite and 2 parts of mixed barium laurate and cadmium laurate in the proportion of 60% of the former to 40% of the latter laurate. The product was then sheeted into a film.

The film had excellent light stability. Also no substantial discoloration or tackiness developed in a 500 hour test in a standard fadometer at a black panel temperature of 125° F.

Example 6

A vinyl film was made as described in Example 5 with 100 parts of Geon 101 (polyvinyl chloride) as the resin, 15 parts of nonylphenyl laurate (product of Example 2) and 40 parts DOP as the mixed plasticizer, and the stabilizer of Example 5.

The resulting film showed excellent overall heat stability when compared with a comparable film using DOP as the sole plasticizer. Furthermore, the loss by volatilization from the film with the mixed plasticizers was only 1.2% by weight in 12 hours as compared to 1.8% loss in the film with DOP alone under the same conditions of exposure. The modulus at 100% elongation was 1455 in the film with the mixed plasticizers as compared to 1300 in the film with DOP alone.

Example 7

100 parts of VYHH (copolymer of about 85% vinyl chloride and 15% vinyl acetate), 18 parts of dodecylphenyl octoate and 37 parts of DOP as plasticizers, and 2.5 parts of the phosphite and laurate stabilizer mixture of Example 5 were milled to a clear flexible film.

When the film was subjected to a bending test no exudation was found under strain during 24 hours of the test.

The low temperature flexibility test by the method of Clash and Berg gave a result −26° C., whereas comparable film made with 55 parts of DOP as the sole plasticizer gave the result −22° C.

Example 8

The procedure of any one of the Examples 1–4 above is modified by substituting any one of the substituted phenols or of the monobasic acids named herein for the substituted phenol or acid used in the specific example modified. Products so made are substituted on an equal weight basis for the alkylphenol esters in Examples 5–7.

It will be observed from the data given that plastics may be made with our new esters that show (1) less loss on volatilization than corresponding plastics made with the more expensive DOP and (2) a higher modulus.

Other plasticizers than DOP may be used in conjunction with our new esters. Thus we may use mixtures of our esters with tricresyl phosphate and dioctyl adipate, in the proportion of approximately 25–75 parts for 100 parts of total plasticizer mixture.

It will be understood that the phosphite-laurate stabilizers in the composition of Examples 5–7 may be substituted by other known even if less effective stabilizers for polyvinyl chloride resin plastics.

It will be understood also that it is intended to cover all changes and modifications of the examples of the invention herein chosen for the purpose of illustration which do not constitute departures from the spirit and scope of the invention.

What we claim is:

1. A plasticized polyvinyl chloride resin composition comprising a polyvinyl chloride resin, a polyvinyl chloride resin plasticizer, and an alkyl phenol ester of an aliphatic monocarboxylic acid having the formula:

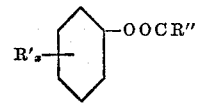

where $x$ is an integer having a value selected from the group consisting of one and two, $R'$ is an alkyl radical having from one to twelve carbon atoms, and at least one $R'$ has at least eight carbon atoms, and $R''$ is an aliphatic hydrocarbon radical having a number of carbon atoms to give a total of from seventeen to forty carbon atoms in the alkyl phenol ester molecule, the said alkyl phenol ester comprising from 25 to 75% by weight of the total plasticizer present in the composition.

2. A composition in accordance with claim 1 in which the alkyl phenol ester is nonyl phenyl laurate.

3. A composition in accordance with claim 1 in which the alkyl phenol ester is dodecyl phenyl-2-ethyl hexoate.

4. A composition in accordance with claim 1 in which the alkyl phenol ester is dinonyl phenyl acetate.

5. A composition in accordance with claim 1 in which the polyvinyl chloride resin plasticizer is dioctyl phthalate.

6. A composition in accordance with claim 1 in which the polyvinyl chloride resin is a copolymer of vinyl chloride and vinyl acetate.

References Cited in the file of this patent

UNITED STATES PATENTS

| | | |
|---|---|---|
| 970,662 | Sulzberger | Sept. 20, 1910 |
| 2,006,345 | Carswell | June 22, 1934 |
| 2,345,006 | Ross et al. | Mar. 28, 1944 |
| 2,442,089 | Lieber | May 25, 1948 |
| 2,520,084 | Dazzi | Aug. 22, 1950 |
| 2,666,039 | Reid et al. | Jan. 12, 1954 |

OTHER REFERENCES

Hackh's Chemical Dictionary, 2nd edition (1937), page 698.

Simonds et al.: Handbook of Plastics, 2nd edition (1949), pages 342 to 343.